United States Patent [19]

Higuchi et al.

[11] Patent Number: 4,872,763
[45] Date of Patent: Oct. 10, 1989

[54] METHOD OF AND APPARATUS FOR MEASURING LIQUID

[75] Inventors: Noboru Higuchi; Keizo Matsui; Chuzo Kobayashi; Shigeru Yamaguchi, all of Kanagawa, Japan

[73] Assignee: Fuji Photo Film Co., Ltd., Kanagawa, Japan

[21] Appl. No.: 188,987

[22] Filed: May 2, 1988

[30] Foreign Application Priority Data

May 1, 1987 [JP] Japan .................................. 62-106412
May 12, 1987 [JP] Japan .................................. 62-113430
May 14, 1987 [JP] Japan .................................. 62-115891

[51] Int. Cl.$^4$ ............................................. B01F 15/04
[52] U.S. Cl. ..................................... 366/160; 137/88; 222/56
[58] Field of Search ................... 366/18, 16, 17, 19, 366/20, 21, 8, 141, 152, 153, 160, 161, 162; 137/88; 222/56, 55, 77

[56] References Cited

U.S. PATENT DOCUMENTS

| | | | |
|---|---|---|---|
| 3,110,421 | 11/1963 | Matthias | 366/18 |
| 3,860,030 | 1/1975 | Mayer | 137/88 |
| 4,209,258 | 6/1980 | Oakes | 366/152 |
| 4,525,071 | 6/1985 | Horowitz | 366/18 |
| 4,581,704 | 4/1986 | Mitsukawa | 366/160 |
| 4,629,392 | 12/1986 | Campbell | 222/56 |

FOREIGN PATENT DOCUMENTS

| | | |
|---|---|---|
| 2360299 | 6/1975 | Fed. Rep. of Germany . |
| 52-37692 | 3/1977 | Japan . |
| 53-29476 | 3/1978 | Japan . |
| 56-74715 | 6/1981 | Japan . |
| 56-148019 | 11/1981 | Japan . |
| 56-155412 | 12/1981 | Japan . |
| 57-29114 | 2/1982 | Japan . |
| 57-72015 | 5/1982 | Japan . |
| 58-163426 | 9/1983 | Japan . |
| 2033582 | 5/1980 | United Kingdom . |

Primary Examiner—Robert W. Jenkins
Attorney, Agent, or Firm—Sughrue, Mion, Zinn, Macpeak & Seas

[57] ABSTRACT

A method for measuring liquid to be transferred from a container or containers to a measurement pot includes the steps of: determining an initial degree of opening of the valve for controlling flow-rate of the liquid from the container to the pot based on the valve's flow-rate characteristics and an arbitrarily chosen set value; opening the valve by the initial degree of opening; detecting the actual amount of liquid that has flowed into the pot; determining a next degree of opening of the valve based on the actual measurement and the set value; and changing the degree of opening of the valve to the next degree of opening. The determination of the degrees of opening of the valve is based on fuzzy control, which uses a fuzzy inference from the set value and actual measured value. An apparatus for measuring liquid for use in a liquid mixing apparatus uses the above-mentioned method.

35 Claims, 14 Drawing Sheets

METHOD OF AND APPARATUS FOR MEASURING LIQUID

BACKGROUND OF THE INVENTION

The present invention generally relates to a method of measuring a liquid. More particularly, the invention relates to a method of measuring a liquid wherein a "fuzzy" inference is effected based on an observed or measured quantity, and/or a quantity derived from the measured quantity, and the invention relates to an improvement of measuring accuracy, expansion of a measuring range and a decrease in time of measurement by sequentially varying a flow velocity of a substance to be measured using the fuzzy inference(s).

Fuzzy control is discussed by E. H. Mamdani in a technical article entitled "Application of Fuzzy Algorithms for Control of a Simple Dynamic Plant" appearing in the Proceedings of IEEE, vol. 121, 1974 at pages 1585–1588 and by L. A. Zadeh in a memorandum entitled "Theory of Fuzzy Sets", Memo No. ERL-M502, Electronic Research Lab., University of California, Berkeley (1975).

The present invention also relates to a liquid measuring mixer for producing a new mixed liquid by intermixing a variety of raw liquids after measuring these liquids.

Further the present invention generally relates to a liquid measuring mixer for adjusting a new mixed liquid by intermixing multiple raw liquids after measuring the raw liquids, and more particularly, to a liquid measuring mixer for precisely and efficiently measuring and intermixing the raw liquids over a wide range of measurement.

A detecting method in the measurement of liquid involves the use of a weight system (e.g., a load cell), a pressure system, (e.g., a differential pressure transmitter), a volume system (e.g., an oval flowmeter) and a variety of other systems.

In all these systems, however, measurement control is performed on condition that the flow velocity is invariable. The measurement controlling system of the closed loop in which the flow velocity is successively varied does not come under the above-described concept.

To increase the accuracy of the measurement, the following techniques have heretofore been utilized.

(1) The first technique (e.g., as shown in Japanese Patent Publication No. 148019/1981) is as follows: The flow velocity changes at two states, and the measurement is made by a change-over to the slower flow velocity in the vicinity of the measurement set value.

EXAMPLE 1. Two kinds of devices having different flow velocities are provided the change-over is executed when the deviation between the measurement set value and the actual measurement value reaches a given conditional value.

EXAMPLE 2. A single device for changing-over the flow velocity to two kinds of fixed conditions is provided and the change-over is executed, as in Example 1, when the deviation reaches the given conditional value.

EXAMPLE 3. Based on the contents of Examples 1 and (2), the conditional value for commanding the change-over is modified from the result of the previous actual measurement by adding a learning function identified as a software function.

(2) The second technique (e.g., as shown in Japanese Patent Laid-Open No. 29114/1982) is as follows: There is an inflow quantity (also referred to as a head quantity) functioning as a measurement stopping condition, and the measurement technique is such that the measurement is previously stopped in anticipation of the inflow quantity.

EXAMPLE 1. The measurement stops when the deviation between the measurement set value and the actual measurement value reaches the given condition.

EXAMPLE 2. The situation is almost the same as that in example 3 of the first technique. However, the conditional value for commanding the halt of measurement is modified by performing arithmetic based on the preceding actual measurement result.

In the above-described measurement control methods, the change-over is carried out by making the flow velocity constant or by varying the velocity at two stages. However, in such measurement control the measurement is fixed within a certain range. Therefore, the following problems are inherent.

(1) Unreliable Measuring Accuracy: A situation where the accuracy is not assured is brought about due to fluctuations in flow velocity which are caused by disturbances and variations in liquid material property (viscosity or the like). In the case of gravity transfer, fluctuations in flow velocity are created in the measurement substance which flows out depending on residual quantities (the amount of residue i.e. head difference) of the measurement substance existing in the supply containers (or tanks), or the supply container located at an upper stream side. If the head difference is large, however, the flow velocity exceeds a certain range, and the accuracy is thereby reduced. This effect also results in restriction of variation-width of the head in the container. In order to keep the head difference within a predetermined conditional range, it is strictly required that the measurement be stopped, or alternatively that the container be properly supplied with more raw material (measurement substance) to keep the supply constantly above a predetermined quantity, which results in a loss of raw material as well as an increase in production cost.

(2) Narrow Measuring Range: Since the flow velocity is restricted, a ratio of a measurable minimum measurement value to a measurable maximum measurement value is approximately 1:5. In a flow velocity 2-stage setting type, the ratio is approximately 1:10 at a maximum. The reason why the measurement range is narrow is as follows. Even if the measurement is halted, there will be an inflow quantity associated with a delay in response of the system. This inflow quantity is determined by the flow velocity. Hence, if the measurement set value is small, the inflow quantity exceeds a guaranteed scope of accuracy, and it follows that the measurement range is restricted. In production plants which deal with a wide variety of materials, there is included such a type that the ratio within the measurement range exhibits about 1:100 at maximum in the case of the same raw material. Therefore, it is necessary to select the measuring devices within a range of measurement set value. In other words, the allowable inflow quantity is assured by narrowing the measuring range under such a condition that the flow velocity is constant. Where the same kind of liquids are measured, and/or if the measurement set values are greatly different, measuring devices having proper measuring ranges are needed, which arrangement results in an increase in the number of devices.

(3) Lack of Control of Measuring Time: Measuring time depends on the measurement set value. If the measurement set value is small, the measuring time is short, and vice versa. Further where the measurement set value is small, an operating time of the system is erratic or scattered, whereby the measuring accuracy is not assured. This effect also leads to a narrower measurement range. In light of the entire system for producing new forms by intermixing multiple already-measured substances, production capability is determined by the measuring time. Especially in a pipeless transfer production system carrier capability is limited. That is, to satisfy a given production capacity, more measuring devices will be required due to a long production cycle.

For the above-described reasons, the conventional liquid measuring mixer includes a multiplicity of independently controlled measuring devices installed for every supply container. These measuring devices are also provided for optimum measuring time in view of any restriction of production capability. As a result, the system becomes intricate, and a remarkable number of measuring devices are required.

Among the proposed measuring systems, as in the case of an oval flow meter, a capacity measuring system is often employed. During use of this system, the liquid has to fill the pipe. This causes such a problem that a loss of raw liquid is created.

In order to attain highly accurate measurement, the measuring device applied to the liquid measuring mixer has heretofore been confined to such a type that a flow velocity is limited, The measuring device of such a type that the flow velocity is variable could not be seen so far.

Where liquids are fed from a plurality of supply container to a piece of container, a conventional type of liquid measuring mixer is required to have the measuring devices attached to the individual supply containers.

For instance, when adopting a capacity measuring system, as illustrated in FIG. 16, two measuring devices c. d are employed for two kinds of liquids e.g. liquids A and B in different containers a, b, respectively. For performing predictive control over an inflow quantity to a mixing container e. a control unit f is required to have control functions using two loops.

A "Liquid Adjusting Apparatus" and a "Method of Supplying Liquid" are disclosed in Japanese Patent Laid-Open No. 74715/1981 and Japanese Patent Publication No. 163426/1982, respectively. Based on the above-described method and apparatus, flow rates of the plurality of liquids are measured by means of a common measuring device. Liquid supplying means for regulating the flow rates are controlled by independent control loops.

Namely, the flow rates of the liquids differ according to liquid quantities in the supply containers (e.g., for the liquids A and B), flow-rate characteristics of the valve and liquid material properties, and hence the highly precise measurement can not be expected under the same control.

This situation is the same with a tank measuring system, It is required that stop valves of actuators attached to respective systems are controlled by control systems of independent loops. (See Japanese Laid-Open Patent Application Publication Nos. 29114/1982, 163426/1983 and 74715/1981.)

With a view to achieving highly accurate measurement, it has been proposed a method of effecting a change-over i accordance with a predetermined measurement deviation by providing parallel valves having different flow velocities. In this case, however, to perform the control function requires the control of two loops.

The reason why this expression "control functions of two loops" is used herein is that when making use of a dispersive type control unit, two pieces of control units are not necessary, because the measuring process can be done in the single control unit. Judging from the number of inputs and outputs and softwares, however, the two pieces of control units are required.

In a batch producing process, when using a multiplicity of medical liquids, the liquid material properties thereof are different. As a result, it often happens that cumulative measurement can not be performed in the same container. Consequently, there is utilized a production system arranged in such a way that: a plurality of liquid receiving containers are prepared; mixable liquids are measured in the same container;,and unmixable liquids are measured in another container. For this reason, an adjusting tank designed for reaction and adjustment has to be provided on the lower stream side.

In a production system where the adjusting tank for the reaction and adjustment is of a fixed type, when producing multiple liquids, the equipments have to be provided according to classification of the liquids. Especially, the fulfillment of highly accurate measurement requires, as explained earlier, the multiplicity of measurement tanks, the adjusting tank, a pipe measuring device attached to the adjusting tank, the control unit and attached valves. In this case, it follows that the equipments are utilized for some kinds of liquids, but are not used for other kinds of liquids. This system has much futility, thereby increasing the initial costs of the equipments. There is increasingly a demand for a multipurpose production system. In the fixed production system, however, a modification in the piping system is required to be made; and further modification in the attached device thereof is also needed, resulting in still more complicated system.

To simplify the construction, there has recently been proposed a moving type batch production system which permits a reduction in the number of measuring devices. In this batch production system, measurement tank or the adjusting tank is put into a moving type.

Where this system is applied to a conventional measuring device, however, the measuring time differs according to magnitude of a measurement set value. If the measurement set value is large, the measurement takes much time, with the result that restriction is given to a carrier time of capacity in the moving type production system. For this reason, in the prior art production system, a required number of measuring devices are provided so as not to give the restriction to the carrier time. This arrangement contradicts the advantage of the moving type production system. Based on the conventional production system, a stay-time in the station is resultantly further extended. (A remarkable number of measuring devices are needed in terms of conditions such as a range of measurement set value, a limit of measuring time, measuring accuracy and so forth. Hence, an operating time for coupling the pipes and other processes increases).

In a production system designed for photographic photo-sensitive materials, light-shielding properties must be kept because of treating the photo-sensitive materials. An increment in the number of joined portions brings about intricacy of the system, and variations in carrier cycle exerts influences on performance of the products.

In the prior art liquid measuring mixer, the measuring control is carried out on condition that the flow velocity is constant. Hence, the conventional mixer has the defects in measuring accuracy, range and time which have been set forth above.

SUMMARY OF THE INVENTION

Accordingly, it is a primary object of the present invention which has been inspired by the above-described circumstances to provide a method of measuring a liquid in a highly accurate manner over a wide range of measurement without being influenced by any fluctuations in flow velocity which are caused by disturbances, the measurement being performed within a short period of time regardless of magnitude of a measurement set value.

To this end, according to the one aspect of the invention, there is provided a method of measuring a liquid with high accuracy over a wide range of measurements in a short time by simple adjustment without depending on system structure, valve flow-rate characteristics and liquid material properties (viscosity or the like).

Namely, the present invention aims at attaining the highly accurate measurement confined to the liquid and eliminating the following defects inherent in a control system, an opening control valve and a detector for measuring a flow rate of a substance to be measured in the heretofore proposed measuring devices.

(1) Conventional measurement control is effected on condition that the flow velocity is constant. The flow-rate characteristics of the valve vary depending upon the head difference, the liquid material properties or the like. As a result, the measuring accuracy is deteriorated.

(2) An apparent fluctuation-width is to some extent created in the observed quantity because of dynamic characteristics of the detector, thus causing a decline of measuring accuracy.

(3) In connection with the flow-rate characteristics of the valve, it is difficult to have constant and linear characteristics. The flow-rate characteristics differ according to the type of valve and the system structure. For this reason, adjustment is required for every structure to attain highly accurate measurement with a reasonable degree of certainty.

In accordance with the present invention, the arrangement based on the flow-rate characteristics of the valve is such that the valve is fully closed in the vicinity of a valve opening degree 0%, and the liquid begins to flow in the vicinity of 100%. The flow-rate characteristics in the case of exceeding this value exclude a quick open characteristic.

The directly observed (or measured) quantity or the computed quantity (difference between the set value and measured quantity and its time variation), which quantity or quantities can be passed through a low pass filter to remove noise are employed for arithmetic processing, in view of the dynamic characteristics, of the detector, to determine a degree of opening of the valve.

The control system makes use of fuzzy control. Depending on the size of the physical quantities, the amount of opening of the valve is determined. In particular, the amount of opening is determined by using one or more predetermined, empirical fuzzy control rules for selecting the opening amount. The rule or rules to use are selected by use of a membership function or functions, in which a membership value or values are each plotted in terms of the physical quantity or quantities (e.g. the difference or deviation between the set value and measured value, and a time variation thereof), and the particular rule or rules to use are selected based on the membership value. In the preferred embodiment, the physical quantities are semi-logarithmically expressed. The initial opening amount of the valve is determined using a fuzzy inference based on the flow rate characteristics of the valve and the set value, then fuzzy inferences using these quantities and the above-mentioned quantities are used to continually or substantially continuously select the next amount of opening of the valve

BRIEF DESCRIPTION OF THE DRAWINGS

The various objects, features and advantages of the invention will be evident upon reading the detailed description below, with reference to the drawings, in which:

FIGS. 6(a) and 6(b) are flow-rate diagrams of the control valve uses in an experiment for evaluating the present invention, wherein FIG. 6(a) shows a flow-rate diagram for a large flow velocity valve and FIG. 6(b) shows a flow-rate diagram for a small flow velocity valve;

DESCRIPTION OF THE PREFERRED EMBODIMENTS

The preferred embodiments of the present invention will hereinafter be described with reference to the accompanying drawings.

Figure 1:
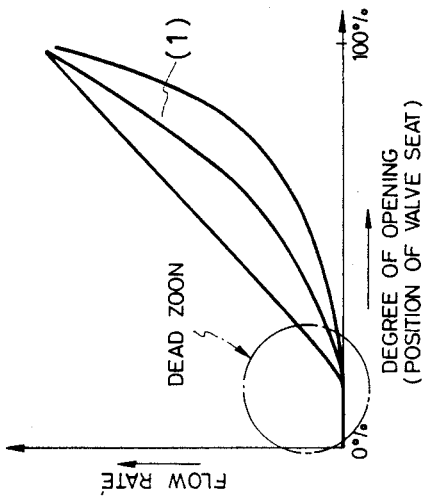
FIG. 1 is an explanatory diagram illustrating a liquid measuring device which can be used to implement one embodiment of the method according to the present invention.

Turning now to FIG. 1, there is illustrated a liquid measuring device for a first embodiment of the present invention. In this embodiment, the description is with respect to a subtraction type measurement in which an amount of liquid flowing from a measurement tank is observed.

In FIG. 1 reference numeral 1 designates a measurement control unit; 2 represents a load cell for measuring a weight of a raw material with which a measurement tank (or container) 8 is charged; 3 denotes a gravimeter/amplifier (AMP); 4 stands for a servo driver (Driver) controlled by the measurement control unit 1; 5 represents a servo motor, which is driven by the servo driver 4, for changing a degree of opening of a control valve 6. The opening control valve 6 is provided for adjusting an amount of liquid flowing from the measurement tank A stop valve 7, which is controlled by the measurement control unit 1, is provided for stopping the outflow of liquid. The opening control valve 6 has its flow-rate characteristics which are classified as equal-percentage characteristics illustrated in FIG. 3, curve (1).

Next, a method of measuring a liquid according to the present invention will be explained.

Figure 2:
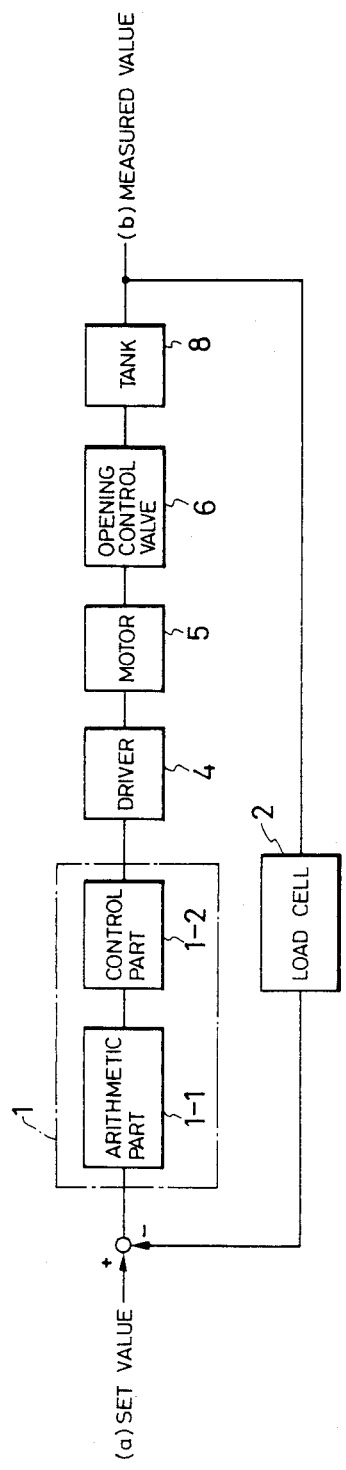
FIG. 2 is a block diagram illustrating the control method for the device depicted in FIG. 1.

FIG. 2 shows a control process relative to the liquid measuring method of the present invention.

Figure 3:
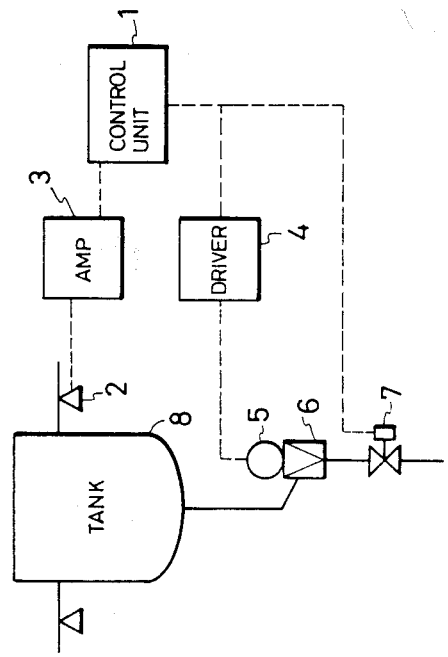
FIG. 3 is a flow-rate diagram of an opening control valve.

Referring to FIGS. 1 and 2, when a measurement set value (indicative of the desired amount of liquid) is given to the measurement control unit 1, an initial opening degree of the valve is computed by drawing a "fuzzy" inference from the flow-rate characteristics of the valve depicted in FIG. 3 in a control part 1-2 of the control unit 1 based on the set value. Simultaneously, when starting the measurement, the control unit 1 gives an indication of initial opening degree through the servo driver 4 to the servo motor 5 of the control valve 6, so that the liquid flows from the tank The actual weight value on the load cell 2 will then vary. The control unit 1 repeatedly receives the actual weight values which are transmitted from the load cell to the unit 1 by the gravimeter/amplifier 3 at a predetermined cycle. An arithmetic part 1-1 provided in the control unit 1 serves to compute both a deviation between the measurement set value and the actual weight value and a time-variation quantity of the deviation, and further computes an observed quantity or quantities obtained by passing the foregoing quantities through a low pass filter to remove noise. The control part 1-2 then arithmetically derives the opening degree of the valve using a prescribed "fuzzy" rule or rules which can be empirically developed. Such fuzzy rules are generally expressed as follows: "If e is A, and $\delta e$ is B, then $\delta u$ is C." Here, e is the deviation, $\delta e$ is its time-variation, and $\delta u$ is the time-variation of the degree of opening of the valve. A and B are empirically selected, and can represent a prescribed range of values, and C is a prescribed amount or range. Thus the selection of the proper fuzzy rule or rules is based on the values of e and $\delta e$, which rules are selected to keep the flow rate (time-variation of the deviation) and the deviation in balance (FIG. 4A in which the rectangles formed by the dashed lines represent areas of balance) so that the flow is controlled to bring the deviation swiftly to zero.

Figure 4:
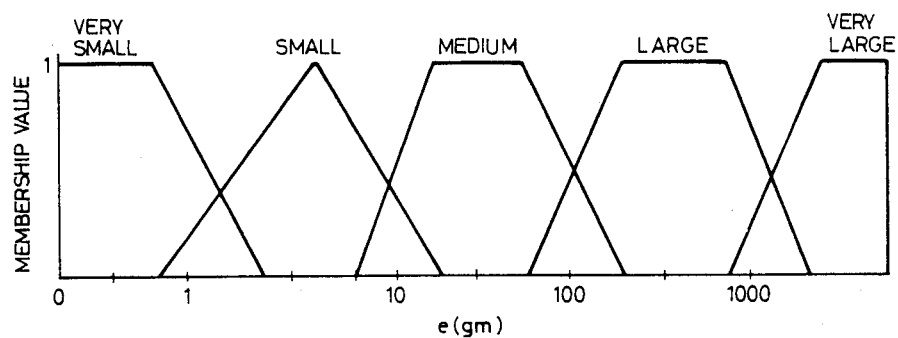
FIG. 4 is a plot of a membership function for fuzzy control.

This selection process can be represented by a membership function, such as shown in FIG. 4, in which the x-axis is the deviation and the y-axis is a membership value (weighting factor). When the deviation e is determined, it will fall either solely within one of the predetermined ranges "small", "medium", etc. and the factor will thus have a value "1" or a value between "0" and "1", or it will fall in an area of overlap and the weighting factor will be between "0" and "1". When the deviation falls within only one range, the rule for the predetermined range can be used. When the deviation falls within an area of overlap, a combination such as by interpolation, of rules can be used. A similar membership function can be used for the time-variation of the deviation $\delta e$, FIG. 4B shows a diagram used for obtaining the time-variation of the degree of opening of the valve $\delta u$. For example, providing that e has a membership value 0.8 in small zone, and $\delta e$ has a membership value 0.6 in large zone and value 0.7 in medium zone. Further, providing that fuzzy rules are (1) e is small and $\delta e$ is large, then $\delta u$ is negative large and (2) e is small and $\delta e$ is medium, then $\delta u$ is negative medium. In this case, a membership value of $\delta u$ is determined at smaller one of values of e and $\delta e$ (other selection is possible). Accordingly, the membership value of $\delta u$ is 0.6 when rule (1) is used, and 0.7 when rule (2) is used. From the membership values, $\delta u$ is obtained by calculating, for example, the center of gravity of the area hatched in FIG. 4B.

In the membership functions, the ranges for smaller deviations (or its time-variation) are made progressively smaller than the ranges for larger deviations. This arrangement is intended to improve the measuring accuracy and to attain a measurement within a short time, by determining the degree of opening of the valve more accurately for smaller deviation quantities than for larger ones. This principle can be applied to the low pass filter processing. When the deviation quantity is small, the measuring accuracy is improved by slackening the dynamic characteristics of the measurement detector by using the deviation quantity from the low pass filter. In other words, the control process of the invention is such that when the deviation between the set value and the actual measured value is large, during a first, stage of fluid flow through the valve, the time-variation may be large, i.e. the membership function(s) and fuzzy rules(s) need not be that accurate. However, over time, the deviation decreases, so fluid flow will need to be controlled more accurately. The membership function(s) and fuzzy rule(s) used are thus made more accurate, and greater control is also achieved by reducing the deviation s time-variation to achieve a relatively constant minute flow.

Immediately after initiating the measurement, the valve 6 is controlled to obtain an adequate degree of opening. As the deviation between the set value and measured value diminishes little by little, the opening degree of the valve 6 is also gradually reduced, thereby decreasing the flow velocity. At this time, if the valve 6 has the flow-rate characteristics of FIG. 3. a shift, corresponding to an opening degree of 10% or thereabouts in the vicinity of a zero deviation on the basis of the fuzzy arithmetic, is produced. Consequently, even when there is mechanical play in the valve, the affects thereof are absorbed by a dead zone and the control system, whereby the measurement can be performed with high precision.

Figure 5:
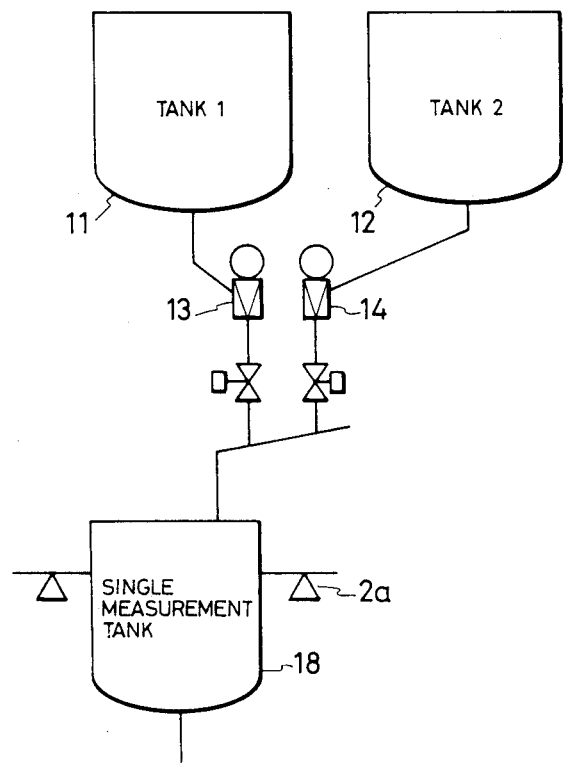
FIG. 5 is a diagram illustrating a cumulative measuring device to which the present invention is applied.

As shown in FIG. 5, the present invention is further applied to a cumulative measurement system in which a load cell 2a measures substances supplied from a plurality of tanks after intermixing these substances in a single measurement tank 18. In FIG. 5, opening control valves 13 and 14 are attached to first and second tanks 11, 12 (tanks 1 and 2), respectively, disposed upstream of the valves 13, 14. Where the flow-rate characteristics of the opening control valves 13, 14 differ, the behavior of the valves after starting the measurement differ. However, the behavior of the valves 13, 14 just before terminating the measurement is substantially the same, if the characteristics in the vicinity of the dead zone illustrated in FIG. 3 do not change too much. It is therefore possible to effect the measurement on the basis of the same membership function and fuzzy rule.

Hence, a wide range of measurement can readily be carried out with high accuracy within a short period of time without depending on the differences between the system structures, the valve characteristics and the liquid material properties.

Next, the description will focus on results of an experiment conducted in accordance with the present invention.

EXAMPLE 1

The experiment was carried out in the measuring device depicted in FIG. 1.

The measuring device which yielded the aforementioned results is capable of measuring of 10 kg at maximum, and included a load cell having an accuracy of 1/5000. The FCV (opening control valve) was controlled by the servo motor, and a control command to charge its opening degree was outputted from the measurement control unit.

Referring to FIG. 6, there is illustrated the flow-rate characteristics of two kinds of opening control valves. The two kinds of opening control valves were sequentially disposed in the system depicted in FIG. 1, and the measurement was conducted without changing the control system.

Figure 6B:
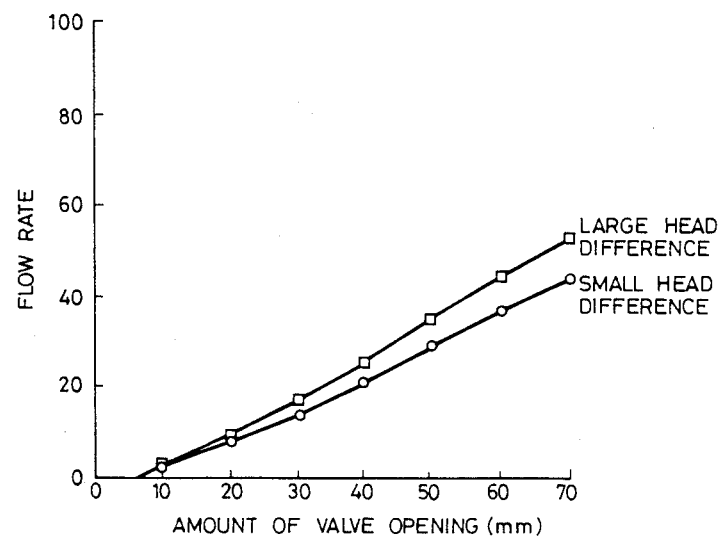
Figure 7A:
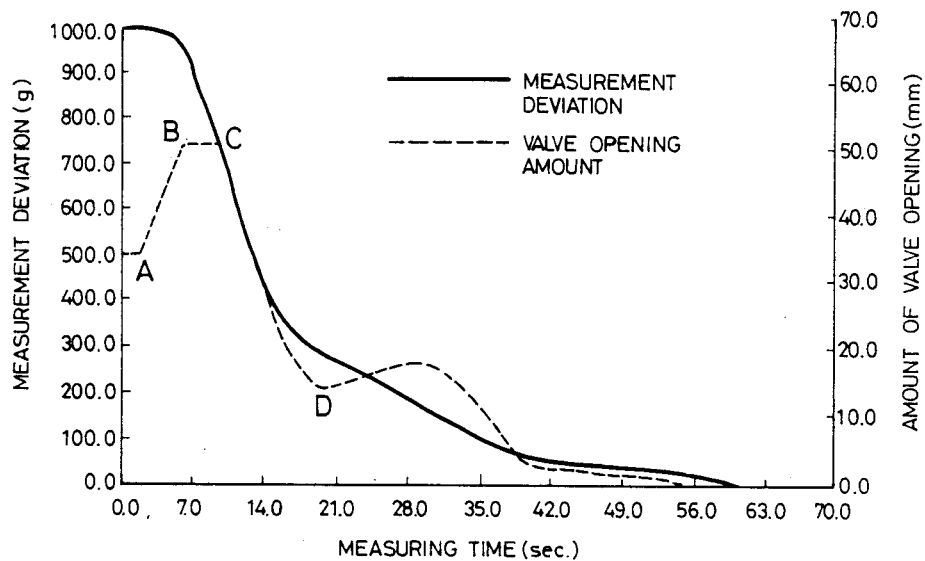
FIGS. 7(a) and 7(b) are diagrams which correspond to FIGS. (a) and 6(b), respectively, showing results of the experiment.
Figure 7B:
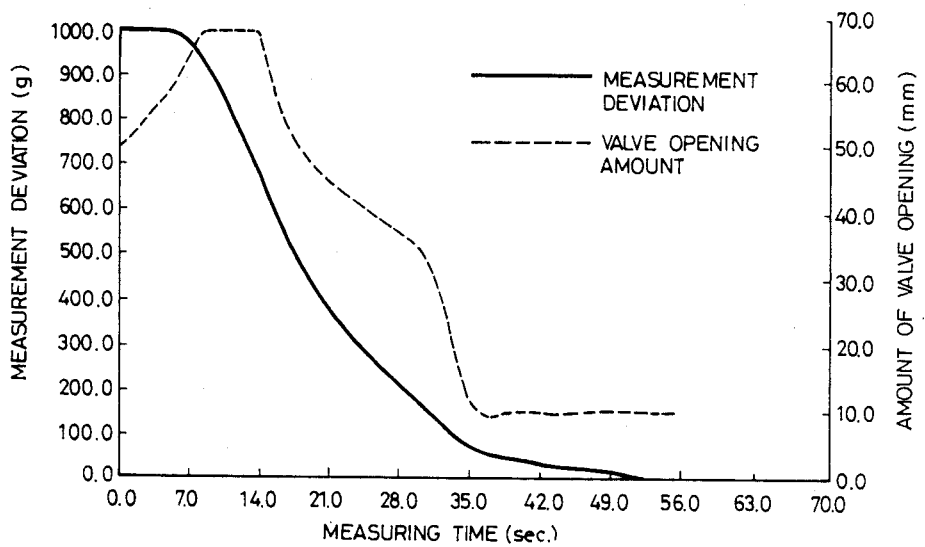

FIGS. 7(a) and 7(b) show the results of measurement of 1000 g. FIG. 7(a) illustrates the results associated with the opening control valve having the flow-rate characteristics depicted in FIG. 7(b) shows the results of FIG. 6(b). As is obvious from FIGS. 7(a) and 7(b), an operating pattern of opening of the control valve, as a matter of course, varies. However, highly accurate measurement results can be obtained during almost the same measurement period.

Figure 6A:
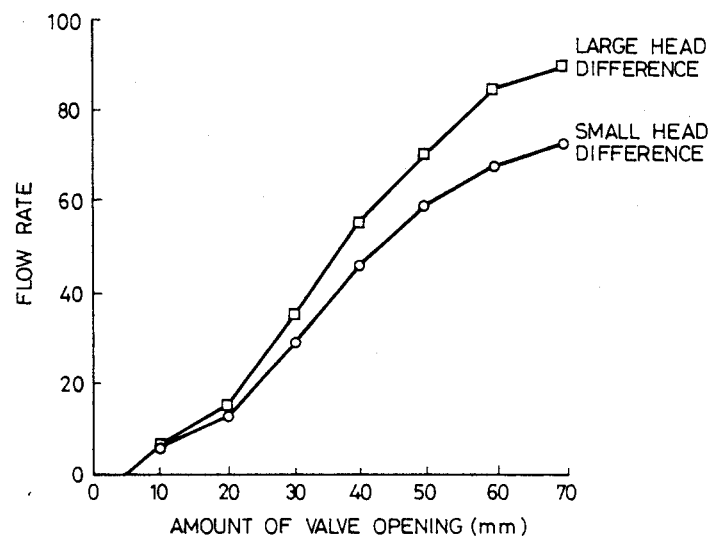

In the measurement system, as shown in FIGS. 6(a) and 6(b), the flow-rate, viz., the flow velocity, differs depending upon the amount of residue (head difference) of the liquid, even if the opening degree is the same. The residual quantity of the liquid is measured at the respective levels but the operating pattern of course differs. Nevertheless, the same results relative to the measuring time and the measuring accuracy are obtained. An accuracy within ±1.0 g is secured within a measuring range of 1:100.

In the foregoing illustrative embodiment, the measurement detector involves the use of the load cell. However, any kind of detectors capable of observing the measurement values of a differential pressure transmitter, a level gauge or the like may be utilized instead of the load cell.

The servo motor has served as an example of a driving device for the opening control valve. However, any type of device capable of changing the valve's opening degree may be used.

A process used for obtaining the result of measurement shown in FIG. 7(a) will be described in more detail in terms of fuzzy control.

Figure 4A:
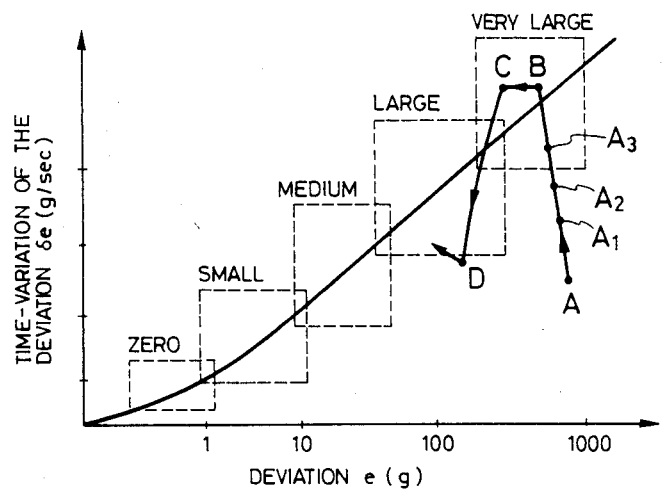
FIG. 4A is a diagram showing a principle of fuzzy control according to the invention.
Figure 4B:
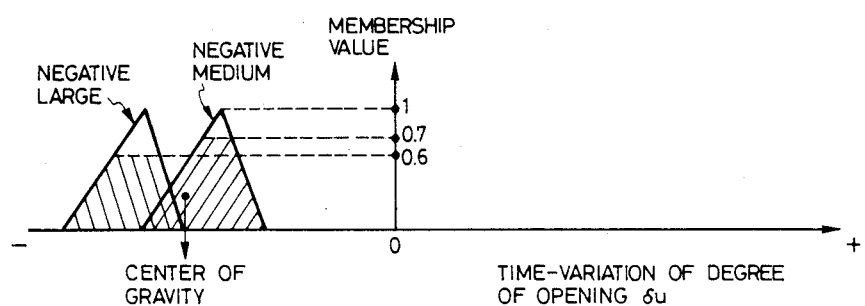
FIG. 4B is a diagram used for obtaining the time-variation of degree of opening of a valve.
Figure 4C:
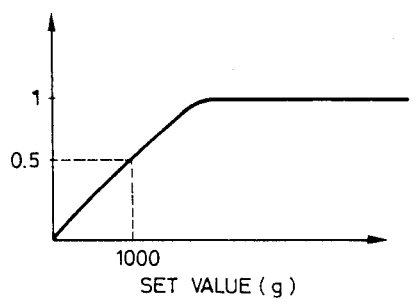
FIG. 4C is a membership function for obtaining an initial opening degree of a valve.

An initial opening degree of the valve is determined by a membership function as shown in FIG. 4C. For example, when the set value is 1000 g, a membership value corresponding to the set value is 0.5 from FIG. 4C. The maximum opening degree of the valve is set at 70.0 mm based on the flow-rate characteristics of the valve, so that the initial opening degree of the valve is set at $70.0 \times 0.5 = 35$ mm. The fuzzy control is not conducted for a while (wasteful time). Since it takes a time to transfer the liquid from a supply tank to a measurement tank as shown in FIG. 5, if the fuzzy control is conducted immediately after initiating the measurement, the opening degree of the valve may be increased excessively. Accordingly, the fuzzy control is not conducted for the wasteful time, which is within 0-9.9 seconds.

In the measurement, fuzzy rules used are as follows:

(1) If deviation e is very large and its time-variation $\delta e$ is medium, then time-variation of opening degree $\delta u$ is positive medium, (2) If e is very large and $\delta e$ is large, then $\delta u$ is positive small, (3) If e is very large and $\delta e$ is very large, then $\delta u$ is zero, (4) If e is large and $\delta e$ is very large, then $\delta u$ is negative small, (5) If e is medium and $\delta e$ is very large, then $\delta u$ is negative medium, (6) If e is medium and $\delta e$ is large, then $\delta u$ is negative small, (7) If e is large and $\delta e$ is large, then $\delta u$ is zero, (8) If e is large and $\delta e$ is medium, then $\delta u$ is positive small, and so on.

At point A in FIG. 7(a) or FIG. 4A, fuzzy rule (1) is used so that $\delta u$ is increased. At point $A_1$ in FIG. 4A, fuzzy rules (1) and (2) are used so that the opening degree further increases. At point $A_2$ in FIG. 4A, fuzzy rule (2) is used. At point $A_3$ in FIG. 4A, fuzzy rules (2) and (3) are used. At point B in FIG. 7(a) or FIG. 4A, fuzzy rule (3) is used so that the opening degree of the valve is not varied. At point C in FIG. 7(a) or 4A, fuzzy rules (3) and (4) are used so that the opening degree of the valve is decreased. Between points C and D in FIG. 7(a) or 4A, some fuzzy rules are used as between points A and B. At point D in FIG. 7(a) or 4A, fuzzy rule (8) is used so that the opening degree of the valve is increased. In the similar way, the fuzzy control is conducted so that the result of measurement shown in FIG. 7(a) was obtained.

As discussed above, the present invention provides the following effects on the basis of the same membership function and the fuzzy rule without depending on the flow-rate characteristics of the control valve and the structure of the measurement system: (1) Highly accurate measurement can be realized without being affected by fluctuations in flow velocity which are caused by disturbances. (2) An accurate measurement system having a wide range of measurement set value can be attained. (3) Measurements can be made within a short period of time regardless of magnitude of the measurement set value.

In addition, as the control unit, production can readily be realized with the aid of a memory which need only have a low capacity, which leads to a decrease in cost of the apparatus.

Figure 8:
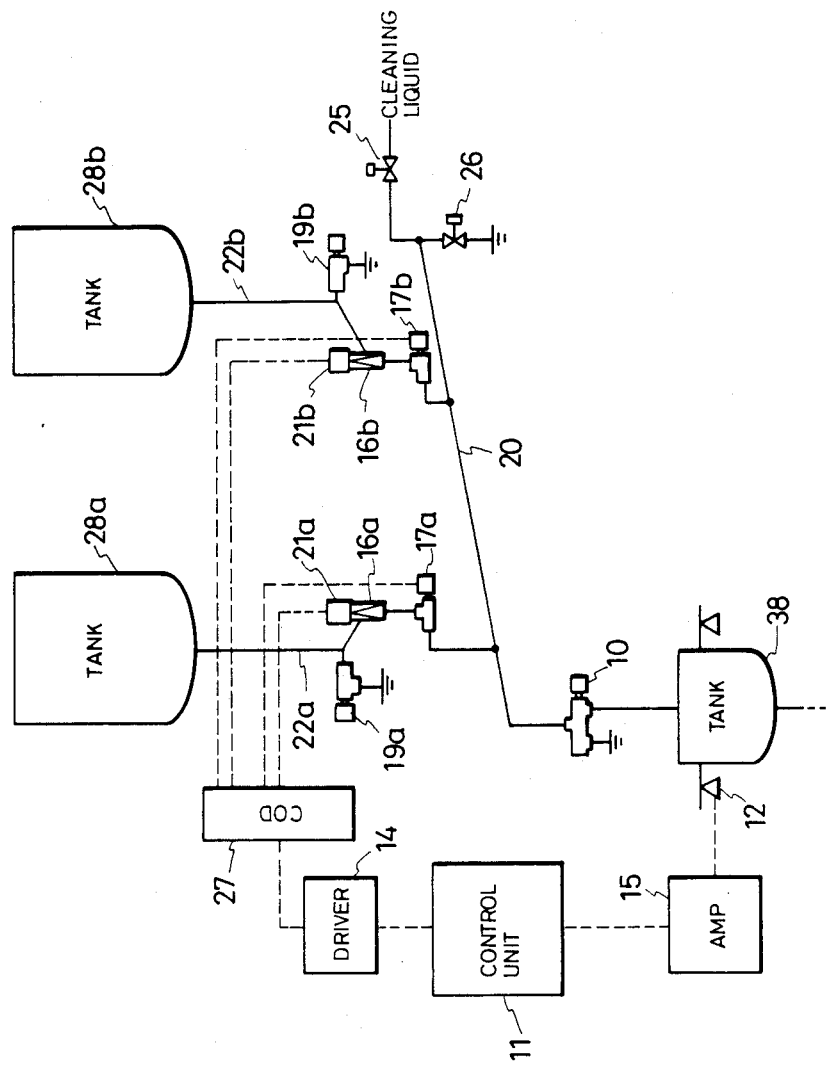
FIG. 8 is a block diagram of a dual liquid measuring device showing an embodiment of an apparatus according to the invention.

A second embodiment of the invention will hereinafter be described in detail with reference to FIGS. 8-11 Referring to FIG. 8, a dual liquid measuring mixing system according to the second embodiment is shown. In the system, raw liquids are supplied from two tanks 28a, 28b serving as liquid receiving containers disposed on the upper stream side, with respect to opening control valves (FCV) 16a, 16b, of a single tank 38 serving as a liquid receiving tank downstream of the valves 16a, 16b. Further, by performing cumulative measurement of the two liquids, the system produces a mixed liquid of proper proportions.

Connected to the upper tanks 28a 28b are piping paths 22a and 22b in which drain valves (DV) 19a, 19b and stop valves (SV) 17a and 17b are provided, The DRVs 19a, 19b and are fitted with the opening control valves (FCV) 16a and 16b, respectively.

The control valves 16a, 16b have their own flowrates which, as illustrated in FIG. 3, exhibit equal-percentage characteristics. The valves are characteristically fully-closed in the vicinity of a degree of valve opening of 0%, but the liquid flows in the vicinity of a 10% degree of opening.

The piping paths 22a and 22b are connected to a common connecting pipe 20. The pipe 20 includes a cleaning/effluent valve (CV) 10 through which the liquid can be transferred to the lower tank 38. Upstream of the connecting pipe 20 are a cleaning initiating valve (CIV) 25 and an air removing valve (ARV) 26. The CIV 25 is provided so that a cleaning liquid (such as water) can be introduced into the connecting pipe 20.

A load cell 12, defined as a detector for measuring a weight of the measurement liquid, is installed in the lower tank 38. The load cell 12 is connected via a load cell amplifier (AMP) 15 to the measurement control unit 11.

The control unit 11, which is connected through a servo driver 14 to a change-over device (COD) 27, effects estimated control on the basis of flow-rate characteristics of the FCVs 16a, 16b, an actual measurement value of the liquid that is measured by the load cell 12 and a measurement set value.

The change-over device 27 is connected to the FCVs 16a, 16b provided in the liquid supplying paths 22a, 22b and further to servo motors 21a and 21b for driving the SVs 17a, 17b, respectively. The change-over device 27 outputs a drive command of the servo driver 14 controlled by the unit 11 after executing a change-over to a selected system.

Figure 9:
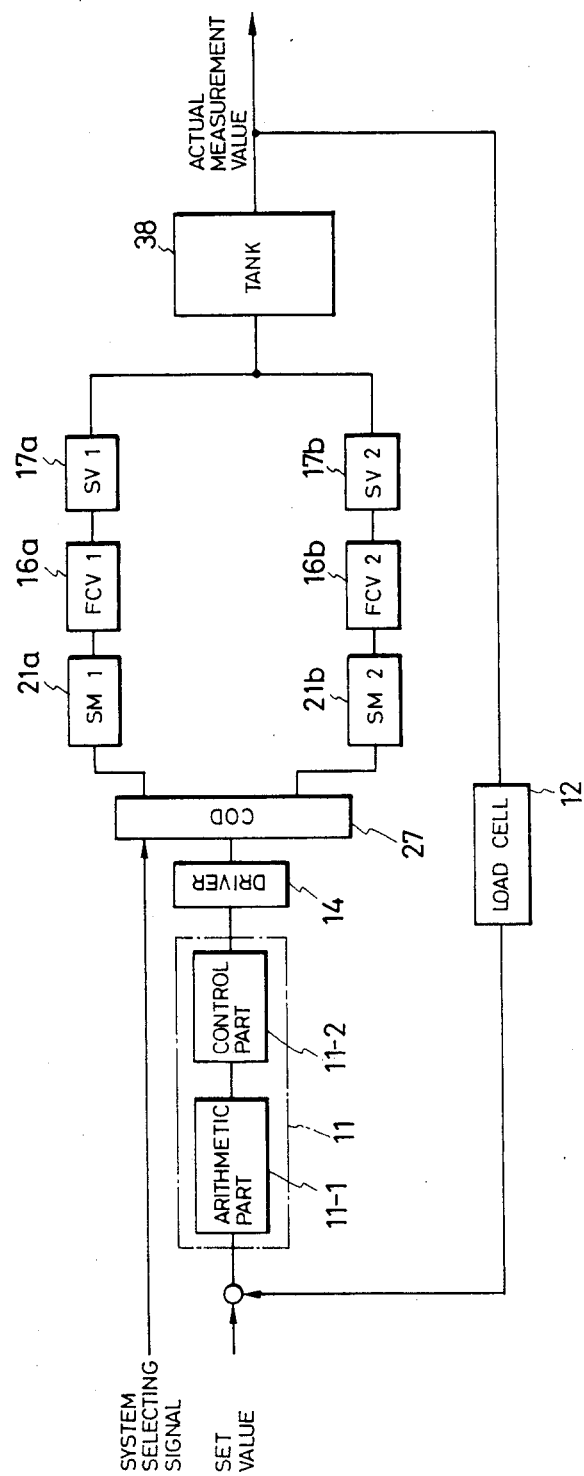
FIG. 9 is a block diagram illustrating a control system for the multiple liquid measuring mixer of FIG. 8.

Next, the operation of the thus constructed liquid measuring mixer will be explained, referring to FIG. 9, which is a block diagram of the control process, as well as to FIG. 8.

Production conditions (such as measured quantities of the liquids within the tanks 28a, 28b) are specified to the measurement control unit 11. The set value (b) is given to the unit 11. Subsequent to this step, the DRVs 19a, 19b and the CV 10 are changed over to a system based on a given system selection signal (a). Upon an indication of initiating the measurement, a command is transmitted from the control unit 11 to the servo driver 19a so that the SV 17a is opened and the FCV 16a is arranged to have a determined initial degree of opening, as explained below. A valve port of the FCV 16a is set in a specified position by driving the servo motor 22a, and the opening degree is adjusted to cause a flow of raw liquid from the tank 28a. At this time, the initial opening degree of the FCV 16a is computed by control part 11-2 of the control unit 11 on the basis of a "fuzzy" inference (or estimation) drawn from flow-rate characteristics of the valve and the measurement set value. Consequently, the raw liquid in the tank 28a begins to be transferred to the tank 38. The load cell 12 of the tank 38 detects the weight of the transferred raw liquid and then feeds back this value through the amplifier 5 to the control unit 11.

A filter arithmetic part 11-1 arithmetically derives an amount of deviation between the fed-back actual weight value and the set value, and a time-variation quantity of deviation, and at the same time the control unit 11 computes a value that is to be obtained by effecting a low pass filter process on the foregoing quantities. Based on the thus computed value, the control part 11-2 executes the arithmetic in accordance with a predetermined fuzzy rule, and seeks a degree of valve opening to which an appropriate flow velocity will be obtained at the subsequent control cycle. At this time, a membership section or sections and the appropriate fuzzy rule or rules are used to control the degree of valve opening.

After starting the measurement, when the measurement deviation decreases, the FCV 16a contracts the opening, thereby obtaining a very small flow velocity. When the measurement deviation and the time-variation quantity thereof diminish, and if the measurement deviation decreases below a certain value, the measurement is stopped. The SV 17a is then closed, Immediately, the FCV 16a is operated to approach a fully closed position. At this time, the flow velocity is extremely small, and the inflow quantity is also infinitesimal. Hence, the inflow quantity after the measurement has ceased is reduced, while the measuring accuracy is improved without depending upon fluctuations in the flow velocity. Since the FCV 16a has the flow-rate characteristics depicted in FIG. 3, there is a shift equivalent to a 10% degree of valve opening or thereabouts in close proximity to a zero deviation on the basis of the estimation arithmetic rule. Even if there is mechanical play in the valve, the unfavorable influences caused by the mechanical play are absorbed by making use of a dead zone and the estimation control system, thereby attaining highly accurate measurement. Furthermore, the operation of the FCV 16a changes according to the measurement set value or the processing system within a measurement range. In addition, the measurement can be done by the same measuring device regardless of magnitude of the measurement set value, resulting in expansion of the measurement range. However, this expansion is within a static accuracy of a detecting end. A pattern of operation of the FCV 16a varies with respect to measuring time, and almost the same short-time measurement can be effected irrespective of magnitude of the measurement set value.

Subsequently, the process is changed over to the measurement of liquid existing in the tank 28b by the system selecting signal (a). The change-over device 27 is changed over to the FCV 16b. A set value (b) is sent to the control unit 11, and the measurement is carried out by performing the same control as that described above in conformity with a measurement initiating command. The control function in the control unit is the same, An output signal of the control part and driver merely is changed over to the SV 17b and the FCV 16b at the operating end by means of the change-over device 27.

The liquids are transferred via the shared connecting pipe 20 to the tank 38. The connecting pipe 20 is arranged such that the diameter thereof is large to permit the residual liquid within the pipe to spontaneously drop down to the CV 10 and tank 38. Therefore, the length of this connecting pipe is as short as possible in order to improve the measuring accuracy. However, if the connecting pipe 20 is not used, pipe arrangements to the tank 38 can be individually made. In this case, the amount of liquid which becomes intermixed is restricted by the size of the tank 38.

In addition, where a plurality of liquids are received, the pipe arrangement is difficult, and therefore presents a problem in terms of providing equipment. However, short and individual pipes are advantageous for obtaining measurements with super-high accuracy to avoid inaccuracies caused by any residual quantity of liquid in the connecting pipe.

The description has been given on the assumption that the flow-rate characteristics of the FCV 16b are the same as those of the FCV 16a. Even when the respective flow-rate characteristics are different from each other, however, the behavior of the opening control valves 16a, 16b just before completing the measurement is substantially consistent, if the characteristics in the vicinity of the dead zone do not differ sharply. Even if the behaviors of the valves 16a, 16b after initiating the measurement differ measurement is practicable using the same membership function and fuzzy rule.

A highly precise measurement can readily be obtained in a short time over a wide range of set values irrespective of differences in the system constitution and valve properties.

The liquid measuring mixer according to the present invention is one example of addition type liquid measurement (a system for measuring the liquid reserved in the measurement tank).

In the Figures, the DRVs 19a, 19b, CV 10, CIV 25 (cleaning initiating valve) and ARV 26 (air removing valve) are auxiliary valves for cleaning and effluent operations.

When measuring the liquid, for instance, in the tank 28a, cleaning is carried out. Then the liquid in the tank 28b is measured. In the case of cleaning only the connecting pipe 20, after finishing the measurement of liquid in the tank 28a, the CV 10 is changed over to an effluent-side, while the CIV 25 is opened for cleaning. At this time, the ARV 26 as well as the SVs 17a, 17b remain closed. After the cleaning has been effected for a predetermined period, the CIV 25 is closed and the ARV 26 is opened. Subsequently, the ARV 26 is closed. Then measurement proceeds to the tank 28b.

In the embodiment explained above, the description has been emphasized for the case where two kinds of liquids are measured and mixed. In this invention, there may be a large number of liquids measured by the same liquid receiving container. However, the number of opening control valves controlled by the same measuring device is preferably eight or thereabouts.

A variant form of the present invention will be explained with reference to FIG. 10.

A combination of the addition type measuring system for measuring the liquid (by placing a detector in the liquid receiving container) and a subtraction type measuring system for measuring an amount of outflow liquid (by placing the detector in a supply container) is characteristic of the arrangement in this variant form. The addition type measuring system has the same components as those in the above-described embodiment of FIG. 8, and hence the description is omitted herein although like symbols are used for like elements.

Figure 10:
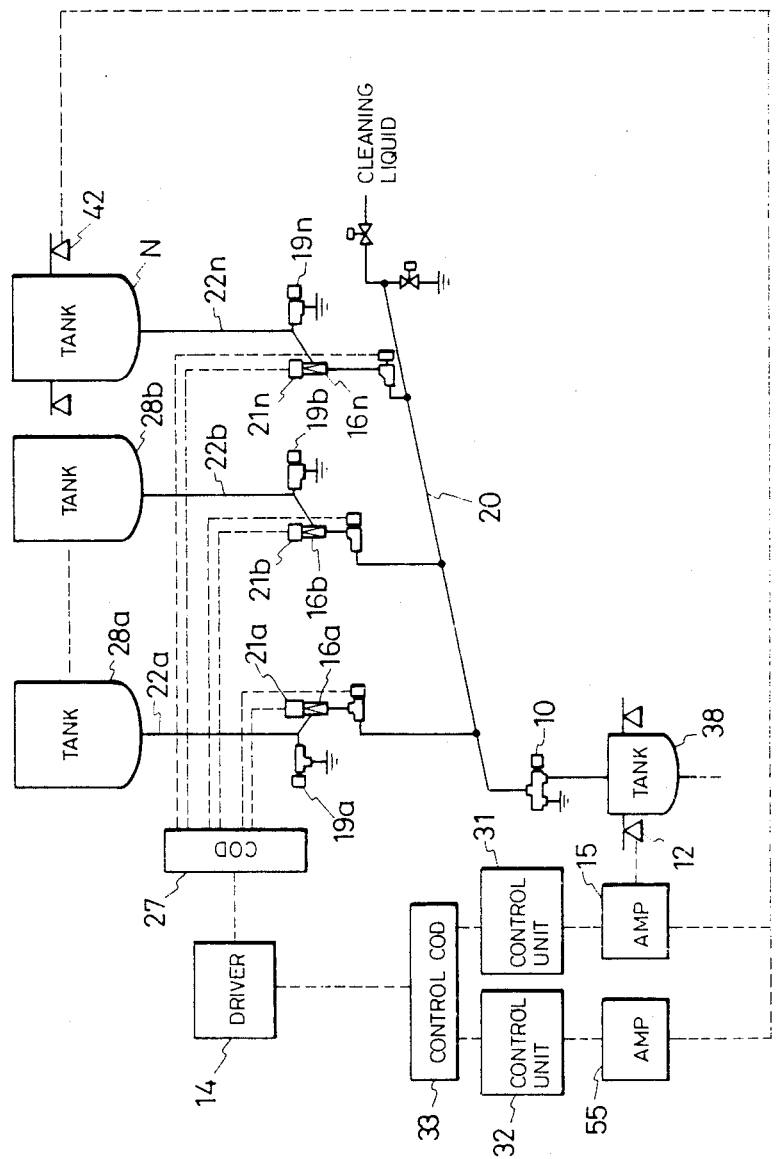
FIG. 10 is a block diagram illustrating a variant form of the liquid measuring mixer according to the present invention.

In the FIG. 10, an N-th supply container also serves as a measurement tank N, providing an upper load cell 42 proximate thereto.

An outflow quantity of raw liquid filling the tank N is measured by an upper load cell 42, and is at the same time fed to the lower tank 38 defined as the liquid receiving container. Then, the raw liquid is cumulatively measured by a load cell 12. Actual measurement values obtained by the cumulative measuring system and the subtraction type measuring system are fed-back through load cell amplifiers 15 and 55 to measurement control units 31 and 32, respectively. The control units 31 and 32 compute deviations between the actual measurement value and individual set values. The control units 31, 32 also compute deviation time-variation quantities, and then output opening commands based on the estimation rule. The outputs of the two control units 31 and 32 are changed over by means of a control system change-over device (control COD) 33 to control servo driver 14.

In the above-described arrangement, infinitesimal measurement is carried out by, for example, the subtraction system, while the measurement containing a large measurement set value is performed by the addition system. This permits a still wider range of measurement.

For a system for only one solution, the measurement tank is equipped with a stirrer, a ho±: water circulating device, etc. The measurement tank is defined as a control tank, and the measurement, a mixing process and a reactive process can therefore be performed in the same container.

In the above-mentioned embodiment, the load cells 12, 42 have been exemplified as detecting devices. Other detectors may, however, be used. For example, such detectors include a pressure detector such as a differential pressure transmitter, and a variety of level gauges. It is to be noted that the measuring accuracy differs depending on the static accuracy of the detector.

In the embodiment described above, the driving device for the opening control valve involves the use of the servo motor. However, any kind of devices capable of effecting positional control may be employed.

As discussed above, by using measuring devices which do not depend on the measurement set value, the residual quantity of liquid and the liquid material properties the liquid measuring mixer according to the present invention brings about:

(1) a reduction in the number of the measuring devices, and (2) a drop in loss of raw liquid.

Hence, the present invention provides the following effects:

(1) a decrease in initial cost in association with the reduction in the number of the measuring devices, (2) a decrease in the number of maintenance processes in association with the reduction in the number of the measuring devices.

(3) a decrease in failure which is due to improved reliability in association with the reduction in the number of measuring devices, and (4) a diminution in operating cost in association with the drop in loss of raw liquid, this diminution being obtained without being influenced by the residual quantity (head difference) of raw liquid on account of controlling the flow-velocity.

Figure 11:
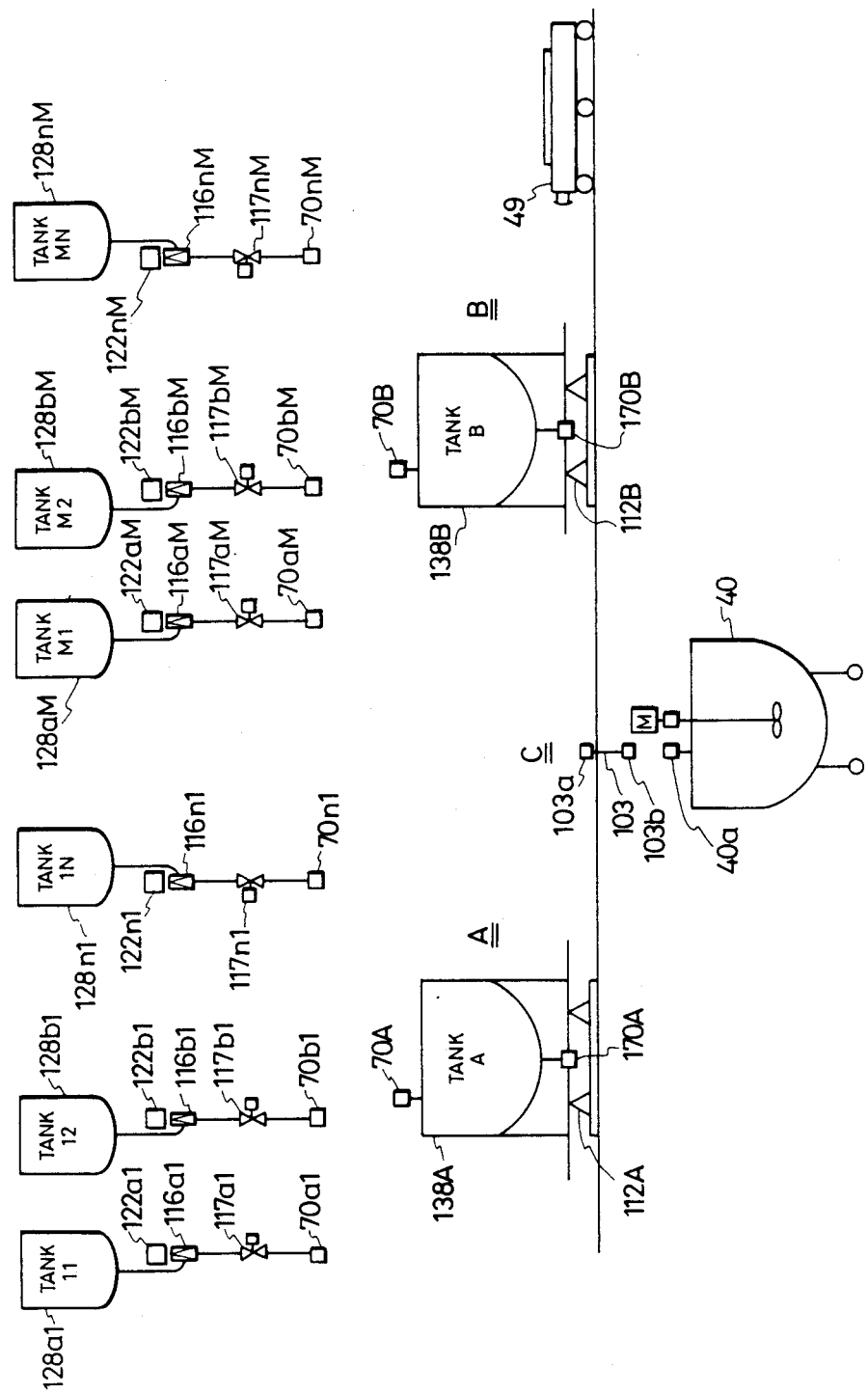
FIG. 11 is a diagram illustrating another embodiment of a liquid measuring mixer according to the present invention.

A further embodiment of the present invention is shown in FIG. 11. There are a first number M groups of liquids which do not pose any problem of contamination between heterogeneous liquids. Supposing that there are a second number N of medical liquids in every M groups, and multiple liquids are prepared for production. A total number of every kind of liquid to be used is less than M×N. A conventional production system requires supply medical liquid containers appropriate for the production liquid and measuring devices 112a, 112b (such as load cells) even when dealing with the same kind f medical liquids irrespective of whether the system is a moving or fixed system, putting the measuring range, the measuring time and the measuring accuracy into consideration. The number of measuring devices amounts to M×N or more. In accordance with the present invention, however, a measurement control unit of the closed-loop type for varying a flow velocity is used, and this control unit effects fuzzy control. Hence, the measuring range, the measuring time and the measuring accuracy are all improved greatly. (M×N)-number of supply liquid containers 128 (i.e. 28a1, 128b1, ... 128n1 and 128aM, 128bM ... 128nM) suffice while the number of measuring devices 112a, 112b which is determined from their capacity, may be small, if there is no problem pertaining to the contamination of liquids.

Two separate measuring elements or devices 112a and 112b (e.g. load cells) are provided herein. The number of the supply liquid containers (or tanks) 128 may be M×N. However, the number of the measuring devices 112a 112b is determined from a time for adjusting medical liquids and a production scale according to the classification of liquids, and hence in some cases it happens that the necessary number of supply liquid containers is more than M×N.

Figure 12:
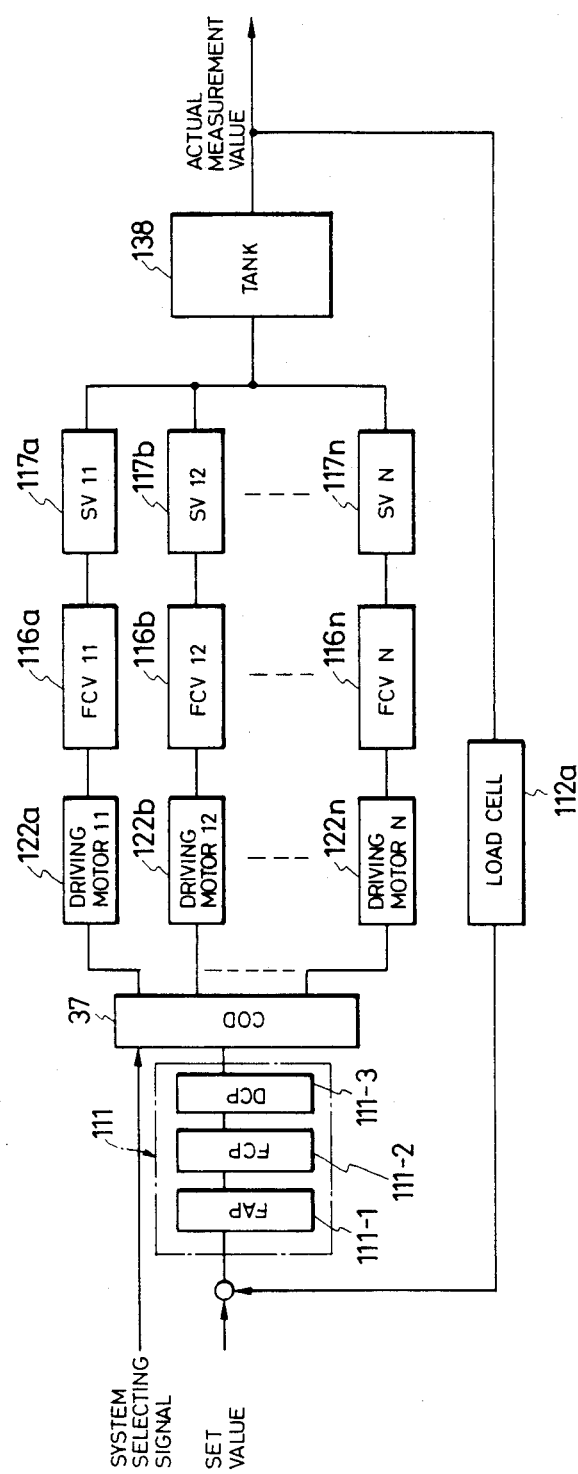
FIG. 12 is a block diagram of a closed loop control for the embodiment of FIG. 11.

FIG. 12 is a block diagram of the system of control for the first group of a (Group 1) of liquid containers 128a1, 128b1 ..., 128n1, but the structure of FIG. 12 is equally applicable to control of the other groups (Groups 2-M). Therefore the control structure for the other groups is not set forth herein in details to avoid repetition.

Each measuring device includes a measurement control unit 111. Outputs of the measurement control unit 111 are changed over by a change-over device (COD) 37 so that the outputs are selectively outputted to a plurality of opening control valves 116 (116a1, 116b1 .. . 116n1) (1 through N) are measured by the same control algorithm in the same liquid receiving container (measurement pot) 138A.

The above-mentioned opening control valves 116 exhibit, as illustrated in FIG. 3, equal percentage characteristics as their flow-rate characteristics, wherein each valve is fully closed in the vicinity of a valve opening degree of 0%, while the liquid begins to flow in the vicinity of a valve opening degree of 10%.

The measurement control unit 111 is composed of a filter arithmetic part (FAP) 111-1, a fuzzy control part (FCP) 111-2 and a driving control part (DCP) 111-1. The measurement control unit 111 serves to execute fuzzy control on the basis of the flow-rate characteristics of the control valves 116 (1 through N), a measurement set value and a measurement value obtained by the measuring device 112, thus controlling the opening degrees of the control valves 116 (1 through N).

Next description will focus on the operating process of the liquid measuring mixer according to the present invention.

From a host production control unit, an indication that the measurement pot (liquid receiving container 138A) should be loaded on a station A with a load cell 112A is given to, for example, an unmanned carry vehicle 49 used for moving the pot onto the station. Subsequently, an indication of measuring the medical liquid in a different predetermined one of the supply liquid containers 128 (e.g. tank 12) is imparted to the measuring device 112a. The change-over device 37 is so provided that the opening control valve 116b1 and stop valve 117b1 of the tank 12 which are selectively changed over by system selecting signal are controllable by the control unit 111.

From the host production control unit, there is given an indication that a coupling device 70b1 attached to the supply liquid container should be coupled to a coupling member of the liquid receiving container 138A (measurement pot A). Upon confirmation of preparations for measurement through the above-described initial stage, the host production control unit issues an indication of initiating the measurement. The stop valve opens in response to the measurement initiating command. The control valve 116b1 receives a positional command from the measurement control unit so that the valve has a predetermined opening degree. A valve port of the opening control valve is set in a specified position by actuating a driving motor 122b1 of the tank 12, thus causing a flow of raw liquids while controlling the opening degree. At this time, an initial opening degree of the valve is computed by the fuzzy control part 111-2 of the measurement control unit 111 from the flow-rate characteristics of the valve and the measurement set value on the basis of the fuzzy rule, whereby the raw liquid of the tank 128b1 begins to be transferred to the liquid receiving container 138A. The measuring device 112A (load cell A) for the tank 138A detects the weight of the transferred raw liquid and then feeds back to the value to the control unit 111.

The fuzzy control part 111-2 of the control unit 111 calculates a deviation between the measurement set value and the thus fed-back supply liquid measurement value and also of a time-variation quantity of deviation, The control unit 111 computes a value which is to be obtained by effecting a low pass filter process on the above-described quantities. The fuzzy control part 111-2 performs estimation arithmetic from the thus computed value, and there is obtained a degree of opening of the opening control valve to which an appropriate flow velocity is gained at the next control cycle by opening the valve to that degree of opening.

At this time, a membership function or functions for the fuzzy inference assume, for instance a semi-logarithmic configuration such as depicted in FIG. 4 wherein the x-axis corresponds to the deviation (difference between the measurement set value and the measured or observed amount) and the y-axis represents a membership value or a weighting factor.

A similar membership function for the time-variation of the deviation is also used. In the membership functions, the x-axis is divided so that sections having smaller physical quantities are made minute. This arrangement is so intended to improve the measuring accuracy of the device and to attain measurement in a relatively short time.

A detailed description of the fuzzy control process according to the invention has already been set forth herein, and therefore a further description thereof will be omitted for the sake of being concise.

After starting the measurement, when the measurement deviation decreases, the control valve 116b1 contracts its opening, resulting in a very small flow velocity. When the measurement deviation and the time-variation quantity of deviation diminish, and if the measurement deviation decreases under a given value, the measurement is halted. The stop valve 117b1 moves in the full-closing direction, at which time the flow velocity is extremely small and the inflow quantity is also infinitesimal. Hence, the inflow quantity after stopping the measurement decreases, while the measuring accuracy is improved without depending upon fluctuations in flow velocity.

Since the control valve has the flow-rate characteristics shown in FIG. 3, there is a shift equivalent to a valve opening degree of 10% or thereabouts in close proximity to a zero deviation on the basis of the estimation arithmetic. Even if there is mechanical play in the valve, the unfavorable influences caused by the mechanical play are absorbed by making use of a dead zone and the estimation control system, thereby attaining highly accurate measurement. Furthermore, the operation of the opening control valve changes according to the measurement set value or the processing system within a measuring range, and the measurement can be done by the same measuring device regardless of magnitude of the measurement set value, with the result that the measuring range is expanded. In connection with the measuring time, the operating pattern of the opening control valve varies, and almost the same measurement can be effected in a short time irrespective of magnitude of the measurement set value. All kinds of medical liquids are measured by executing the operation of the above-described content in accordance with the classification. Subsequent to this step, the liquids are transferred to the adjusting tank 40 provided downstream of the measurement pots.

Immediately when a movement-command is issued from the host production control unit to the transfer station C, the automatic carry vehicle 49 carries the liquid receiving container 138A (measurement pot A) to the station C, whereby it is coupled to an upper portion 103a of a device 103. If the adjusting tank 40 is movably mounted similar to the pot A and moving device 49 depicted in FIG. 11, the adjusting tank also moves and is then coupled to a lower portion 103b of the pipe connecting device 103. Upon confirmation of this coupling, a foot valve of the liquid receiving container 138A (measurement pot A) is controlled by a carrier control unit. The valve is then opened, and the liquid is thereby transferred to the tank 40.

Figure 13:
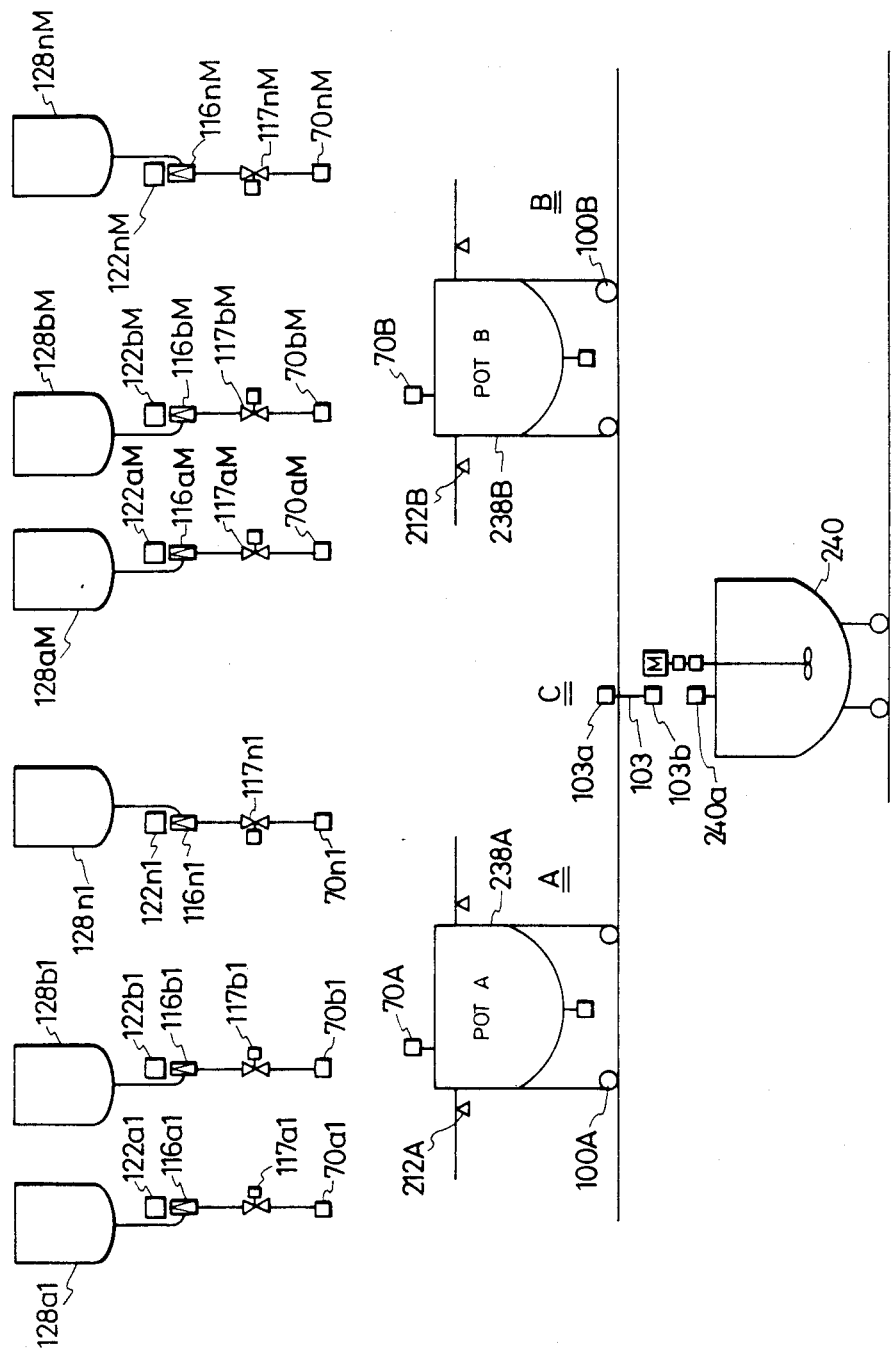
FIGS. 13 and 14 are diagrams illustrating further modifications of the present invention.

FIG. 11 shows an arrangement in which the measuring devices 112 (load cells) are disposed at the stations A and B, and movement of the pots to a predetermined position is effected by the unmanned carry vehicle 4g. It is permitted that the liquid receiving container 138A itself (measurement pot), as illustrated in FIG. 13, includes the measuring device 138A and the carrier function, viz., wheels 100A. Under such a construction, the coupling device is not fixed to the station in contrast to the situation in FIG. 11. It is, however, required that an electrical connecting device such as a positional detecting sensor be provided in each coupling position.

Figure 14:
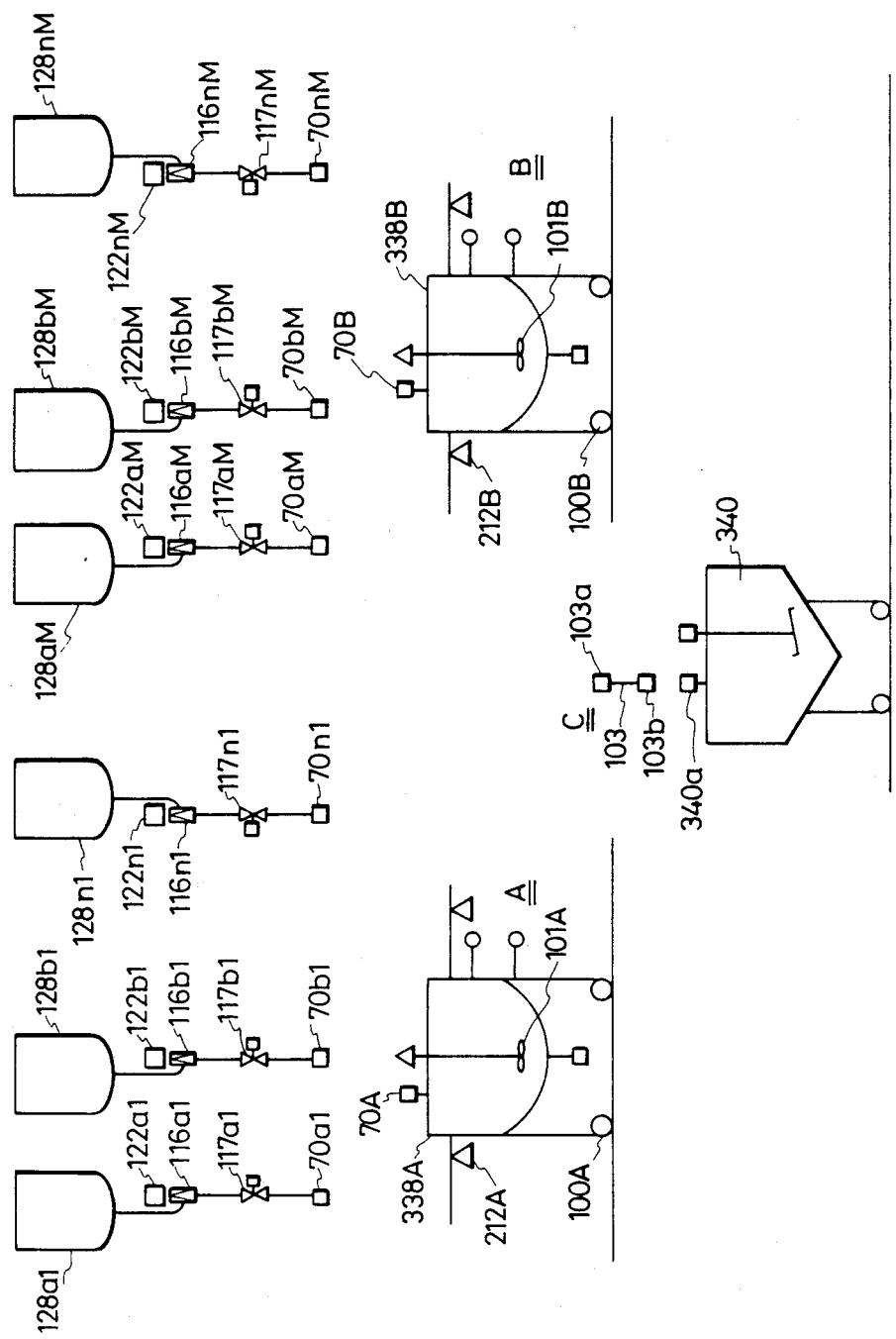
Figure 15:
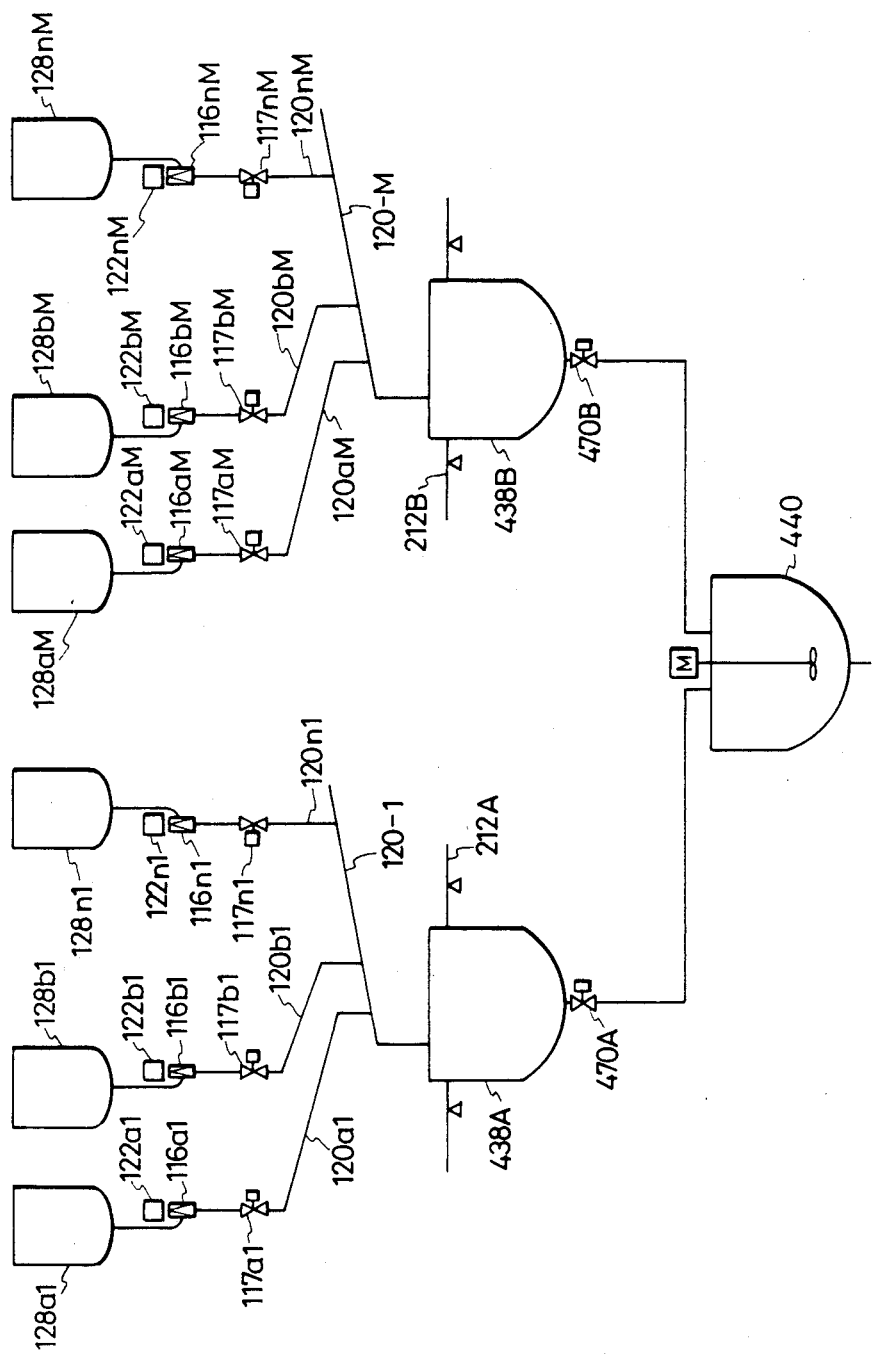
FIG. 15 is a diagram for illustrating a further modification of the present invention.
Figure 16:
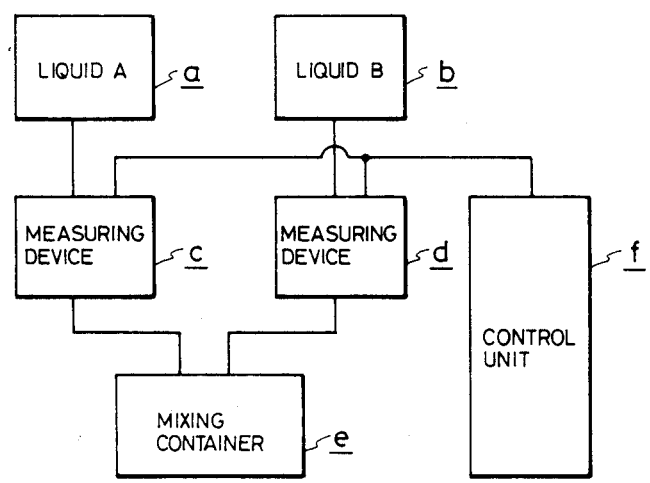
FIG. 16 is a diagram of a conventional liquid measuring mixer.

As illustrated in FIG. 14, blades of respective stirrers 101A and 101B are added to the liquid receiving containers 338A, 338B, and the containers are transferred to a stirrer station 102. Each of the liquid receiving containers 338A, 338B are made to have intermixing and reactive functions, thus also serving as an adjusting tank. As a result, a still more efficient system can be obtained.

In the above-described embodiment, the measuring devices 338A, 338B involve the use of the load cells 312A, 312 B. However, the situation is the same, if other measuring devices are employed. Especially when the differential pressure transmitter is used in the tank in FIGS. 13 and 14, it is possible to fix the liquid receiving container to an automatic travelling vehicle, which facilitates the manufacture of the liquid receiving container. Consequently, vibrations have no influence.

When employing the measurement control unit having functions of the adding measurement in the liquid receiving container and of the subtracting measurement by fitting the measuring device to the supply liquid container, a much wider range of measurement is practicable.

In a liquid measuring mixer in which a liquid receiving container receives a plurality of liquids from a plurality of supply liquid containers after cumulatively measuring the liquids and then the liquids are intermixed therein, the improved liquid measuring mixer according to the present invention is arranged such that: the supply liquid containers include opening control valves provided in supply liquid pipes: and a supply liquid measurement control unit is identified as a precision measurement control unit of a closed loop control type which controls opening degrees of the control valves on the basis of an estimation to thereby change a flow velocity of the supply liquids, corresponding to individual supply liquid measurement values, the control unit includes a moving device for moving the liquid receiving container. In a system which adopts the control unit according to the present invention, highly accurate measurement can be attained without undergoing influences due to variations in flow velocity produced by disturbances. In addition, the measurement can quickly be conducted within a short period of time for a wide range of measured values. The number of measuring devices is decreased, and the necessary equipment is thereby simplified. Even in the case of a large-scale system with lots of devices, the production capability is augmented. Enhancement of product-quality and a reduction in loss of raw materials can be realized by adjustment in a large scope. As a result, it is feasible to decrease the initial costs, maintenance costs and the operating costs as well. Furthermore, reliability is also improved.

We claim:

1. A method of controlling the flow of a set amount of liquid through a valve, the method comprising the steps of:
   (a) determining an initial degree of opening of the valve for controlling a flow-rate of the liquid using fuzzy control in accordance with a prescribed fuzzy rule based on flow-rate characteristics of the valve and the set amount;
   (b) opening the valve by the initial opening degree to allow the liquid to flow through the valve;

(c) obtaining an actual measurement value corresponding to the amount of the liquid which has flowed through the valve;

(d) determining a next degree of opening of the valve using fuzzy control in accordance with the prescribed fuzzy rule based on the actual measurement value and the set amount; and (e) changing the degree of opening of the valve to the next degree of opening.

2. A method as set forth in claim 1, wherein the actual measurement value is obtained substantially continuously, the next degree of opening of the valve is substantially continuously determined, and the degree of opening of the valve is substantially continuously changed.

3. A method as set forth in claim 1, the flow-rate characteristics of the valve are determined prior to opening the valve, and the initial degree of opening of the valve is determined prior to opening the valve.

4. A method as set forth in claim 1, wherein the flow-rate characteristics of the valve are determined prior to opening the valve, and the valve has a dead zone corresponding to a range of the degree of opening of the valve in which the flow-rate is substantially constant.

5. A method as set forth in claim 4 wherein the dead zone is from a zero degree of opening to approximately a ten percent degree of opening, 6. A method as set forth in claim 4, wherein a deviation, and a time-variation of said deviation, between said set value and said actual measurement value ar both determined and passed through a low-pass filter, in determining the next degree of opening of the valve.

7. A method as set forth in claim 1, wherein a deviation, and a time-variation of said deviation, between said set amount and said actual measurement value are both determined and passed through a low-pass filter, in determining the next degree of opening of the valve.

8. A method as set forth in claim 1, wherein a deviation, and a time-variation of said deviation, between said set amount and said actual measured value are determined, said prescribed fuzzy rule being such that said time-variation is more precisely calculated and is reduced as a measurement time increases.

9. A method of as set forth in claim 8, wherein the flow-rate characteristics of the valve are determined prior to opening the valve, and the valve has a dead zone corresponding to a range of the degree of opening of the valve in which the flow-rate is substantially zone.

10. A method as set forth in claim 9, wherein the deviation, and a time-variation of said deviation between said set amount and said actual measurement value are both determined an passed through a low-pass filter.

11. A method as set forth in claim 1, further comprising a step of closing the valve when said actual measured value is within a predetermined amount of said set amount.

12. An apparatus for controlling the flow of a set amount of liquid through a valve, the apparatus comprising:

(a) means for determining an initial degree of opening of the valve for controlling a flow-rate of the liquid using fuzzy control in accordance with a prescribed fuzzy rule based on flow-rate characteristics of the valve and the set amount;

(b) means for opening the valve by the initial opening degree to allow the liquid to flow through the valve;

(c) means for obtaining an actual measurement value corresponding to the amount of the liquid which as flowed through the valve;

(d) means for determining a next degree of opening of the valve using fuzzy control in accordance with the prescribed fuzzy rule based on the actual measurement value and the set amount; and (e) means for changing the degree of opening of the valve to the next degree of opening.

13. An apparatus for measuring liquid and for mixing at least first and second liquids, the apparatus comprising:

(a) first means for containing the first liquids;

(b) second means for containing the second liquids:

(c) means for receiving respective amounts of the first and second liquids;

(d) first means for defining a flow path between said first containing means and said receiving means:

(e) second means for defining a flow path between said second containing means and said receiving means;

(f) first means for regulating flow-rate of the first liquid along said first flow path means to said means for receiving said first means for regulating having a degree of opening corresponding to the flow-rate;

(g) second means for regulating flow-rate of the second liquid along said second flow path means to said means for receiving said second means for regulating having a degree of opening corresponding to the flow-rate;

(h) means for obtaining an actual measured value corresponding to an amount of liquid received by said means f r receiving: and (i) a control mechanism including:

(1) means for determining the degree of opening of the first and second means for regulating the degree of opening of said first means for regulating being based on the actual measured amount of liquid received by said means for receiving and a first set value and a degree of opening of said second means for receiving being based on the actual measured amount of liquid received by said means for receiving and a second set value and (2) means for controlling the respective amounts of opening of the first and second means for regulating in response to the determinations of the respective amounts of opening.

14. An apparatus as set forth in claim 13, wherein said means for determining the degree of opening performs the determination by means of fuzzy control.

15. An apparatus as set forth in claim 14, wherein the fuzzy control is based on fuzzy inference from a deviation and a time-variation of said deviation, between said set value and said actual measured value, using a prescribed fuzzy rule.

16. An apparatus as set forth in claim 15, wherein said means for determining determines said deviation, and a time-variation of said deviation, between said set value and said actual measured value, said prescribed fuzzy rule being such that said time-variation is more precisely calculated and is reduced as a measurement time increases.

17. An apparatus as set forth in claim 14, wherein said means for controlling closes said first means for regulating and switches from controlling the amount of opening of said first means for regulating to controlling the amount of opening of said second means for regulating when said actual measured valued is within a predetermined amount of said set value.

18. An apparatus as set forth in claim 17, wherein said first means for defining a flow passage has a stop valve mounted thereto, downstream of said first means for regulating, responsive to said control mechanism regulating, for preventing flow of the first liquid to the receiving means, and said second means for defining the flow passage has a second stop valve mounted thereto, downstream of said second means for regulating, responsive to said control mechanism for preventing the second fluid from flowing to said means for receiving.

19. An apparatus as set forth in claim 14, wherein each of said first and second means for regulating has a dead zone corresponding to a range of the degree of opening of said first and second means for regulating, respectively, in which the flow-rate is substantially zero.

20. An apparatus as set forth in claim 14, initial degrees of opening for said first and second means for regulating based of the respective first and second set values and flow-rate characteristics of said first and second means for regulating.

21. An apparatus as set forth in claim 13, wherein said first and second means for defining the respective first and second flow passages include a common flow passage at a position downstream of said first and second means for regulating.

22. An apparatus for measuring liquid and for mixing a plurality of liquids, the apparatus comprising:
 (1) a plurality of liquid transfer devices, each of said devices comprising:
   (a) containing means for containing a liquid of said plurality of liquids;
   (b) means for defining a flow path for the liquid from said means for containing; and
   (c) means for regulating flow-rate of the liquid through said flow path:
 (2) means for receiving respective amounts of each of said plurality of liquids:
 (3) means for connecting each said flow path with said receiving means;
 (4) means for obtaining an actual measured value corresponding to an amount of liquid received by said means for receiving: and
 (5) a control mechanism including:
   (a) means for determining an opening degree of each said means for regulating, said degree of opening corresponding to the flow-rate of the liquid through said means for regulating, the determination being based on the actual measured value of liquid in said means for receiving and a set value; and
   (b) means for controlling the amount of opening of said means for regulating in response to the determination of the amount of opening.

23. An apparatus for measuring liquid as set forth in claim 22, wherein said means for determining the degree of opening performs the determination by means of fuzzy control using a prescribed fuzzy rule.

24. An apparatus as set forth in claim 23, wherein the fuzzy control is based on fuzzy inference form a deviation and a time-variation of said deviation, between said set value and said actual measured value.

25. An apparatus as set forth in claim 23, wherein said means for determining computes respective initial degrees of opening for said first and second means for regulating based on the respective first and second set values and flow-rate characteristics of said first and second means for regulating.

26. An apparatus as set forth in claim 23, wherein said means for determining determines a deviation and a time-variation of said deviation, between said set value and said actual measured value, said prescribed fuzzy rule being such that said time-variation is more precisely calculated and is reduced as a measurement time increases.

27. An apparatus as set forth in claim 22, wherein said means for controlling changes the amount of opening of one of said means for regulating to zero when said actual measured value is within a predetermined amount of said set value for the one of said means for regulating.

28. An apparatus as set forth in claim 27, wherein each of said first and second means for regulating has a dead zone corresponding to a range of the degree of opening of the first and second means for regulating, respectively, in which the flow-rate is substantially constant zero.

29. An apparatus as set forth in claim 28, wherein the dead zone is between a zero degree of opening of said valve and approximately a ten percent degree of opening of said valve.

30. An apparatus as set forth in claim 22, wherein said plurality of liquid transfer devices comprises a first plurality of transfer mechanisms and a second plurality of transfer devices, and said means for receiving comprises a first means for receiving the liquid from said first plurality of devices, and a second means for receiving the liquid from said second plurality of devices.

31. A device for mixing a plurality of liquids after cumulatively measuring the liquids, the device comprising:
 (a) means for receiving respective amounts of each of said plurality of liquids;
 (b) a plurality of liquid transfer mechanisms comprising:
   (1) containing means for containing one liquid of said plurality of liquids;
   (2) means for defining flow paths between each of said means for containing and said means for receiving;
   (3) means for regulating flow-rate of the liquid through said flow path, said regulating means being disposed between said means for containing and said means for receiving;
 (c) means for obtaining an actual measured value corresponding to an amount of liquid received by said means for receiving; and
 (d) a control mechanism including:
   (1) means for determining an opening degree of each means for regulating said degree of opening corresponding to the flow-rate of the liquid through said means for regulating, the determination being based on the actual measured value of liquid in said means for receiving and a set value; and
   (2) means for controlling the amount of opening of each said means for regulating in response to the determination of the amount of opening, wherein said device further comprises means for mixing the received liquid.

32. A device for mixing as set forth in claim 31, wherein said plurality of liquid transfer mechanisms comprises a first plurality of mechanisms and a second plurality of mechanisms, and said means for receiving comprises a first means for receiving the liquid from said first plurality of mechanisms and a second means for receiving the liquid from said second plurality of mechanisms.

33. A device for mixing as set forth in claim 32, wherein said means for mixing comprises a tank for receiving the liquid from said first and second means for receiving, and each of said first and second means for receiving includes means for connecting with said means for mixing for transferring the liquid in the connected one of said first and second means for receiving to said means for mixing.

34. A device for mixing as set forth in claim 33, further comprising means for moving each of said first and second means for receiving, and means for moving said means for mixing.

35. A device for mixing as set forth in claim 31, wherein said means for mixing is mounted on said means for receiving.

* * * * *